(12) United States Patent
Marino et al.

(10) Patent No.: US 10,536,060 B2
(45) Date of Patent: Jan. 14, 2020

(54) METHOD FOR MANUFACTURING A ROTOR OF AN ELECTRIC ROTARY MACHINE WITH PERMANENT MAGNETS INSERTED BY FORCE

(71) Applicant: MOTEURS LEROY-SOMER, Angouleme (FR)

(72) Inventors: Alban Marino, Nanclars (FR); François Turcat, Montignac/Charente (FR); Stéphane Dufau, Angouleme (FR); Mario Pereira, Chateauneuf sur Charente (FR)

(73) Assignee: MOTEURS LEROY-SOMER, Angouleme (FR)

( * ) Notice: Subject to any disclaimer, the term of this patent is extended or adjusted under 35 U.S.C. 154(b) by 401 days.

(21) Appl. No.: 15/110,774

(22) PCT Filed: Dec. 22, 2014

(86) PCT No.: PCT/IB2014/067207
§ 371 (c)(1),
(2) Date: Jul. 11, 2016

(87) PCT Pub. No.: WO2015/104614
PCT Pub. Date: Jul. 16, 2015

(65) Prior Publication Data
US 2016/0336839 A1    Nov. 17, 2016

(30) Foreign Application Priority Data
Jan. 9, 2014  (FR) ..................................... 14 50158

(51) Int. Cl.
*H02K 15/03* (2006.01)
*H02K 1/27* (2006.01)
*H02K 1/02* (2006.01)

(52) U.S. Cl.
CPC ............... *H02K 15/03* (2013.01); *H02K 1/02* (2013.01); *H02K 1/2766* (2013.01); *H02K 2213/03* (2013.01)

(58) Field of Classification Search
CPC ........ H02K 15/03; H02K 1/02; H02K 1/2766; H02K 2213/03
See application file for complete search history.

(56) References Cited

U.S. PATENT DOCUMENTS

| 4,922,152 A | * | 5/1990 | Gleghorn | ............. H02K 1/2766 29/598 |
| 5,097,166 A | * | 3/1992 | Mikulic | ................. H02K 21/46 310/156.83 |

(Continued)

FOREIGN PATENT DOCUMENTS

| CN | 102217170 A | 10/2011 |
| JP | 2004-328819 A | 11/2004 |
| JP | 2007-336671 A | 12/2007 |

OTHER PUBLICATIONS

May 8, 2015 International Search Report issued in International Patent Application No. PCT/IB2014/067207.

(Continued)

*Primary Examiner* — Minh N Trinh
(74) *Attorney, Agent, or Firm* — Oliff PLC

(57) ABSTRACT

A method for producing an electric rotary machine including a rotor magnetic mass formed by a stack of superimposed electrical sheets containing housings, and a plurality of permanent magnets inserted in the housings, the housings being provided with a plurality of lugs for locking the permanent magnets in the housings.

15 Claims, 2 Drawing Sheets

(56) References Cited

U.S. PATENT DOCUMENTS

| | | | | |
|---|---|---|---|---|
| 5,159,220 A | * | 10/1992 | Kliman | H02K 1/2766 |
| | | | | 310/156.56 |
| 5,679,995 A | | 10/1997 | Nagate et al. | |
| 6,047,460 A | * | 4/2000 | Nagate | H02K 1/276 |
| | | | | 205/137 |
| 6,919,663 B2 | * | 7/2005 | Iles-Klumpner | H02K 1/276 |
| | | | | 310/156.01 |
| 7,105,971 B2 | * | 9/2006 | Asai | H02K 21/14 |
| | | | | 310/156.45 |
| 9,979,244 B2 | * | 5/2018 | Droit | H02K 1/276 |
| 2012/0091848 A1 | | 4/2012 | Sakai et al. | |
| 2013/0334910 A1 | | 12/2013 | Takahashi et al. | |
| 2015/0380994 A1 | * | 12/2015 | Koechlin | H02K 1/2773 |
| | | | | 310/156.08 |
| 2016/0336839 A1 | * | 11/2016 | Marino | H02K 1/2766 |

OTHER PUBLICATIONS

May 8, 2015 Written Opinion issued in International Patent Application No. PCT/IB2014/067207.

* cited by examiner

METHOD FOR MANUFACTURING A ROTOR OF AN ELECTRIC ROTARY MACHINE WITH PERMANENT MAGNETS INSERTED BY FORCE

FIELD OF INVENTION

The present invention relates to electric rotary machines and in particular those comprising a rotor composed of a magnetic mass formed by an assembly of magnetic sheets and of permanent magnets.

BACKGROUND

Process

Generally, the permanent magnets may be disposed at the surface, directly facing the air gap, or, in a variant, may be disposed within the magnetic mass, in housings therein, the rotor then being classed as a "rotor with buried magnets".

In this latter case, it is necessary to assure a radial and/or axial mechanical blocking of the magnets in their housings, wherein this blocking must be sufficient in order to prevent damage to the magnets and allow correct operation of the machine. In effect, in the event of insufficient chocking, the magnets may be subjected to micro-displacements, which may lead to the destruction of the magnets, to a degradation of the electric and magnetic performances of the machine, and to a balancing fault.

In order to fix the magnets in their housings, a number of techniques are currently used, such as the use of glue, the use of a specific magnet shape and a specific shape of the corresponding housing, for example the use of magnets having a trapezoidal cross section, the impregnation of the magnet in its housing following the placement of said magnet, or blocking by addition of a deformable piece, such as a chock. However, these techniques have some disadvantages. Their implementation may be awkward and costly. For example, a process in which the magnets are glued in the housings may be inconvenient with regard to the working conditions, may pose a problem of durability over the assembly time for some applications, and makes the recovery of the magnets practically impossible without damage.

With regard to impregnation, this is a long and very costly process, which is also cumbersome in terms of implementation, taking into account the need to use containers of varnish and ovens. In addition, this imposes a thermal constraint linked to the demagnetization of the magnets (the temperature of impregnation having to be lower than the thermal limit resulting in a demagnetization of the magnets) and also makes the recovery of the magnets impossible without damage.

The use of magnets having a specific shape is not always possible insofar as such shapes may complicate the provision of the magnetic sheet and may increase the cost of the cutting tools and therefore the total production cost of the machine.

Influence on Performance

An optimal electromagnetic performance is obtained when a buried magnet is in perfect contact at each of its two north and south polar faces with the magnetic mass in which it is inserted, the passage of the magnetic flux from the magnets to the magnetic mass being maximized.

However, there is in general a play between the magnets and their housings in the magnetic mass in which said magnets are inserted, thus constituting an air gap from a magnetic viewpoint, which necessarily results in a reduction of the electromagnetic performance of the machine. A play of this type is linked to the manufacturing constraints, which do not make it possible, for a reasonable cost, to observe very precise dimensions when cutting the magnetic mass or when designing the magnets. A play may also be caused by the fact that, because the magnets are sensitive to corrosion, it may be necessary to cover the magnets with a protective coating, which also results in an uncertainty with regard to the dimensions of said magnets.

In addition, the assembly constraints make it necessary to retain a certain play between the magnets and the housings of the magnetic mass, so as to facilitate the insertion of the magnets into the latter, in particular when the magnetic mass is formed by a stack of thin magnetic sheets. In effect, in this case, the walls of the magnetic mass may not be perfectly straight, taking into account the fact that they are constituted by a stack of thin sheets, which may necessitate an even greater assembly play. Conventionally, a tolerance range of +/−1-0.2 mm may be provided in the dimensions of the magnets. In addition, it may be necessary to provide an assembly play reaching 0.1 mm, even better 0.15 mm on either side of the magnets for the assembly. Ultimately, a play of approximately 0.25 to 0.5 mm, preferably from 0.25 to 0.35 mm per magnet may be obtained conventionally, which is far from negligible relative to the usual air gaps between rotor and stator currently observed in low to medium power electric machines, which are approximately from 0.5 mm to 1 mm.

In the case in which the machine comprises a plurality of magnets disposed in a number of rows per pole in the magnetic mass, the plays of the magnets in different rows are added together and further reduce the magnetic performance of the machine.

Application JP 2007-336671 discloses magnets having cavities which engage with lugs present in housings.

U.S. Pat. No. 5,679,995 discloses housings comprising lugs on their edges. These lugs bend or deform plastically in order to hold the permanent magnets in the housings.

Application JP 2004-328819 discloses the use of springs in housings in order to clamp magnets therein. The application US 2013/0334910 describes housings having grooves in order to facilitate the passage of the fixing resin along the edges of the magnets.

There is a need to further improve the magnetic performance of rotary machines with permanent magnets and to reduce the manufacturing and assembly costs thereof.

SUMMARY

The invention, in accordance with one of the aspects thereof, thus relates to an electric rotary machine, comprising:
a rotor magnetic mass, formed by a stack of superimposed magnetic sheets having housings,
a plurality of permanent magnets inserted into said housings,
the housings having a plurality of lugs for clamping the permanent magnets in the housings, these lugs being formed by cutting the magnetic sheets.

The invention allows a very rapid and relatively more economical placement of the magnets in their housings.

For example, a simple insertion tool, preferably a small-sized press and a support made of a non-magnetic material, are sufficient if the permanent magnets are previously magnetized. The gain in productivity compared with a technique with gluing and polymerization or with impregnation consequently is not negligible. The industrialization is easier compared with the prior art.

The invention produces particularly satisfactory results for machines of which the value of the parasitic air gap is between 0 and 10 times, even better between 0 and 3 times the value of the rotor/stator air gap, this value making it possible to leave the performance of the machine unaffected to a greater extent.

The invention also makes it possible to hold all the sheets via the magnets, which makes it possible to avoid, if desired, the holding of the sheets usually obtained by stapling, gluing or welding.

In addition, because the resistance to displacement is proportional to the extent of the contact surfaces, the risk of a reduction of the clamping during any displacement is relatively low, whilst still allowing a relatively significant admissible play for the blocking.

The thickness of each of the magnetic sheets is, for example, between 0.2 mm and 1 mm, even better between 0.2 mm and 0.5 mm.

Each housing may contain one or more permanent magnets. For example, at least one of the housings may receive a plurality of permanent magnets. In this case, the south poles are oriented all on a same side of the housing, and the north poles on the other.

The housings may each have, in cross section perpendicularly to the axis of rotation of the machine, a general elongate shape along an axis X, this axis X being preferably substantially parallel to the polar faces of the one or more magnets received in the housing.

The housings are preferably of constant cross section along the axis of rotation of the machine.

The permanent magnets are preferably made of ferrite, because, in addition to the fact that ferrites are less costly than magnets based on rare earths, their hardness makes it possible to use them, if desired, in order to cut the lugs at the tip of said lugs during the insertion of the magnets.

The magnets may have, in cross section, a general rectangular or trapezoidal shape. The polar faces of a magnet are preferably the faces corresponding to the longest sides of the magnet.

The number of lugs per housing may vary, in particular depending on the number of magnets received in the housing. The housings preferably have, in cross section, at least two, even better four lugs, per magnet.

For example, the housings have, in cross section perpendicularly to the axis of rotation of the machine, at least one lug, even better two lugs, per magnet, preferably on each of the opposite sides of the housing on either side of the axis X. The number of lugs is preferably identical on each of the opposite sides of the housing on either side of the axis X. In a variant, the number of lugs per magnet may be different from two and from four.

The lugs may also be present on the short sides of the housings, as appropriate.

At least in one housing, the lugs may be all situated on a single side, preferably a long side.

The distance e between the tip of a lug and the adjacent longitudinal end of the magnet in contact therewith is preferably greater than or equal to l/5, where l denotes the length of the magnet.

For example, a distance e between l/3 and l/4 makes it possible to avoid bending the sheets too excessively, in particular in the case in which the successive housings are close to each other.

The lugs are, for example, rounded or truncated at their tip before the magnets are placed in position.

In a variant, the lugs may be flat or pointed at their tip before the magnets are placed in position.

The lugs are preferably in contact via their tip with the magnets.

The two polar faces of the magnets are preferably in contact with the lugs. For example, in a housing receiving a plurality of magnets, each magnet is in contact with the lugs at each of the polar faces of said magnet.

For example, the polar faces of the magnets are planar and are preferably devoid of any notch.

The lugs situated on the opposite sides of the same housing preferably face one another. For example, four lugs per magnet, that is to say two lugs facing two lugs, makes it possible to balance the forces across the magnet and to avoid any phenomena of bending.

In a variant, the lugs may be offset, for example, in their positions along the longitudinal axis of the housing, observed in cross section perpendicularly to the axis of rotation of the machine.

The distance d between the tip of a lug and and the side of the housing to which said lug is connected, prior to the placement of the magnets, is preferably between 0.01 mm and 0.5 mm, even better between 0.25 mm and 0.35 mm. The lugs may have a radius of curvature between 0.1 mm and 5 cm.

The lugs may be present on each sheet of the stack of sheets in a manner superimposing one another, that is to say all the sheets comprise a lug at the same position, and the lugs of the different sheets superimpose one another.

In a variant, at least one sheet may not have lugs. For example, only one sheet in n in the stack, where n is an integer greater than 1, has lugs, where n is preferably equal to 2, 3 or 4.

At least one housing may have at least one stop, against which a magnet received in said housing comes to rest via a longitudinal end.

The stop is preferably situated close to the ends of the housings, and a magnet is in contact with a stop against a flank thereof. The height D of the stop is preferably between 1 mm and 3 mm.

The invention also relates to a method for manufacturing an electric rotary machine comprising:
  a rotor magnetic mass formed by a stack of superimposed magnetic sheets having housings,
  a plurality of permanent magnets inserted into the housing, the housings having a plurality of lugs for clamping permanent magnets in the housings,
in which method the lugs of the magnetic sheets are cut by the magnets as said magnets are inserted into the housings, the magnets preferably having sharp edges.

The lugs are preferably formed by cutting of the magnetic sheets.

The invention also relates to a method for manufacturing an electric rotary machine according to the invention, in which method the magnets are inserted by force into the housings.

The housings may be deformed during the insertion of the magnets, for example by means of pressing. The permanent magnets, which are made of a material that is harder than the stack of magnetic sheets, may deform the lugs and thus create an assembly without play. The magnets may have chamfered or broken edges.

The lugs of the magnetic sheets may be cut by the magnets as said magnets are inserted into the housings, the magnets preferably having sharp edges in this case.

In a variant, the magnets may be inserted into the housings without cutting the lugs, the magnets preferably having chamfered edges.

The magnets, at their longitudinal ends, preferably are not in contact with the sheets in order to facilitate the cutting.

The use of stacked sheets reduces the propagation of microcracks, which tend to appear at the front corners of the magnets during the insertion.

The invention could be better understood upon reading the following detailed description of non-limiting exemplary embodiments of the invention and upon examination of the accompanying drawing, in which:

DETAILED DESCRIPTION OF EMBODIMENTS

Figure 1:
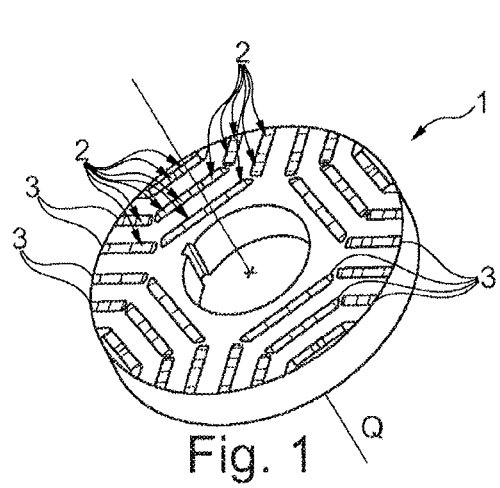
FIG. 1 is a schematic view of a stack of rotor sheets according to the invention.
Figure 2:
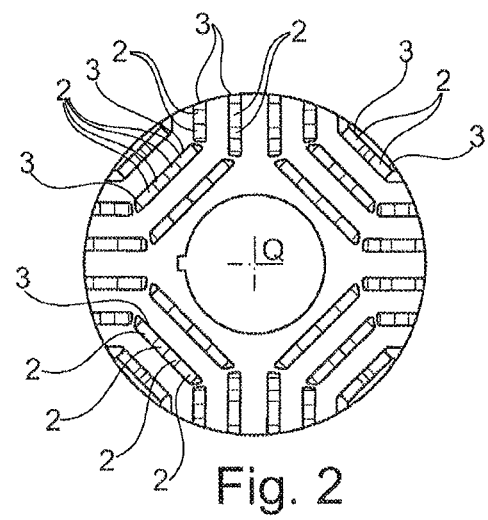
FIG. 2 shows a view from above of the stack of FIG. 1.

FIGS. 1 and 2 show a rotor mass 1, having an axis of rotation Q, comprising housings 3 receiving permanent magnets 2.

The rotor mass 1 is formed by a stack of rotor magnetic sheets.

The housings 3 may each comprise a single magnet 2 or a plurality of magnets 2 inserted into the same housing 3.

Figure 3:
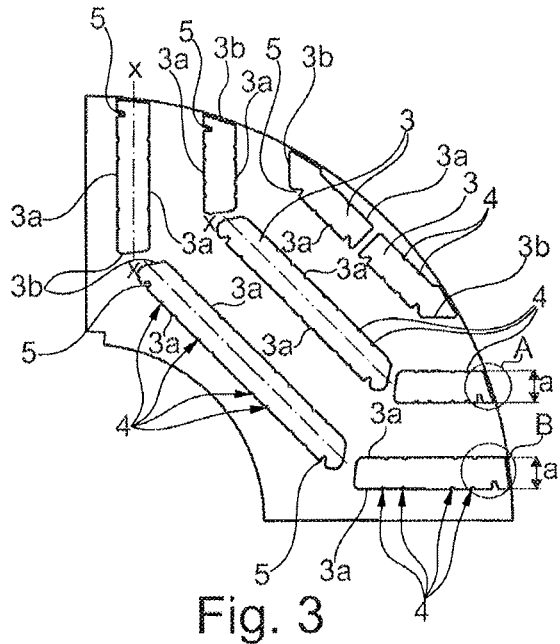
FIG. 3 shows a detailed and partial view of the stack of FIG. 2, prior to the insertion of the magnets.

The housings 3 are of elongate form, each along a longitudinal axis X, which is preferably straight. The housings 3, as illustrated in FIG. 3, have lugs 4 on each of the opposite long sides 3a thereof.

The housings 3 may comprise positioning stops 5, numbering one or two per housing 3, connected to the same long side 3a.

Figure 4:
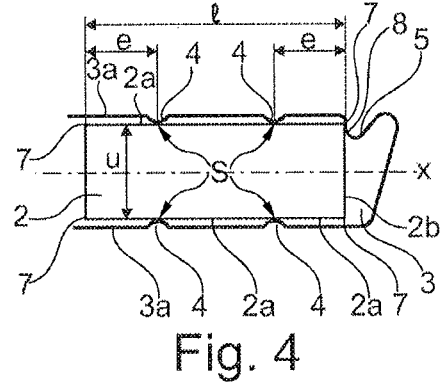
FIGS. 4 and 5 show, respectively, a housing with and without magnet.
Figure 5:
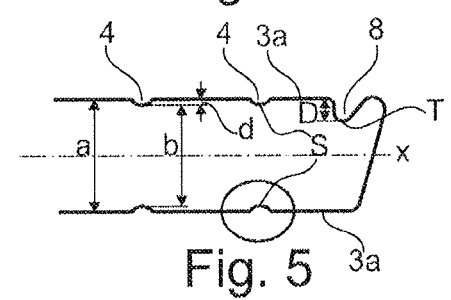
Figure 6:
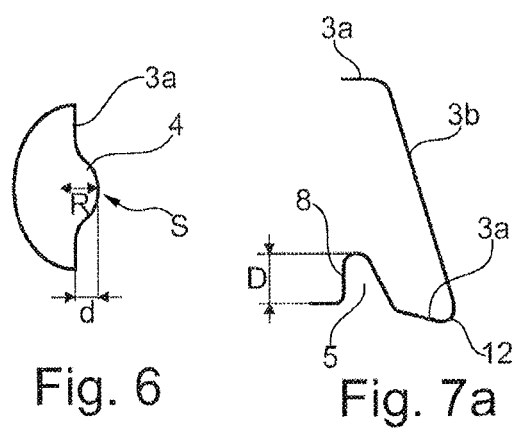
FIG. 6 shows a lug in isolation and on an enlarged scale.

In the example illustrated in FIGS. 4-6, the housing 3 has four lugs 4, numbering two per long side 3a. The lugs 4 face one another and fix the magnet 2 therebetween.

The lugs 4 are, at least prior to the placement of the magnets 2, of rounded shape at the tip S and have a radius of curvature R equal to 0.5 mm. A shape of this type allows the housings 3 to be provided with the lugs 4 in a simple manner by a cutting tool and assures sufficient robustness.

The distance e along the axis X, which is visible in FIG. 4, between the tip S of a lug 4 and the adjacent longitudinal end 7 of the corresponding magnet 2 ranges between ¼ and ⅓ of the total length l of the magnet 2, and is preferably l/3.6 or l/3.

The magnet 2 rests via its polar faces 2a on the lugs 4 substantially parallel to the longitudinal axis X and comes into contact via its end face 2b with a blank 8 of the stop 5.

The width a of a housing 3, measured perpendicularly to the axis X, is for example greater by 0.5 mm to 0.7 mm than the distance u between two tips S of the lugs 4 facing one another.

For example, in the case in which the width a of a housing 3 is 0.6 mm greater than the distance u between two tips S of lugs 4 facing one another, a permanent magnet 2, for example a rectangular permanent magnet, having a width u 0.3 mm smaller than the width a of the housing allows a clamping of 0.3 mm at the lugs 4.

The distance d between the tip S of a lug 4 and the side 3a of the housing carrying the lug 4 is, for example, prior to the insertion of the magnet, 0.3 mm. The height D of a stop 5 is 2 mm, for example.

All the housings 3 in the stack of sheets may have the same width a.

Figure 7A:
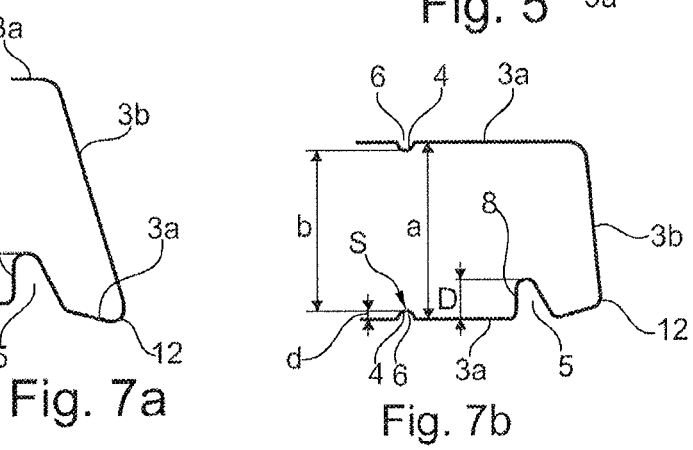
FIGS. 7a and 7b shows the zones A and B of FIG. 3, FIGS. 8a-c illustrate examples of distribution of the lugs in the direction of the thickness of the stack.
Figure 7B:
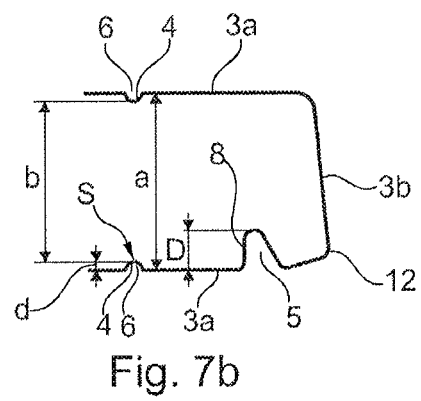

The housings 3 may have different shapes between the stop 5 and the short side 3b, as illustrated in FIGS. 7a and 7b.

Figures 8A, 8B, 8C:
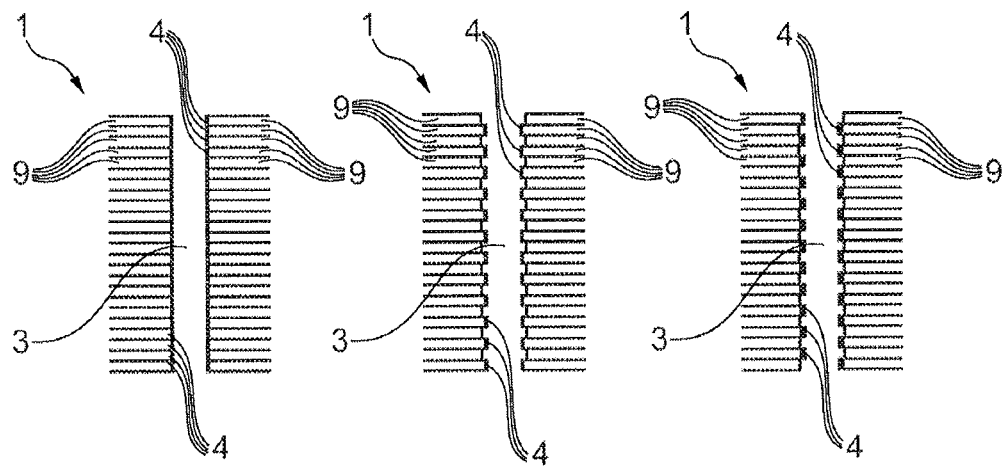

All of the sheets 9 in the stack may be each provided with a lug 4, and the lugs 4 may be superimposed, as illustrated in FIG. 8a. In a variant, as illustrated in FIG. 8b, one sheet 9 in two has lugs 4, the lugs 4 facing one another on the opposite sides 3a of the housing 3.

In the variant illustrated in FIG. 8c, the lugs 4 alternate from one sheet to the other on the opposite sides 3a of the housing 3.

Figure 9:
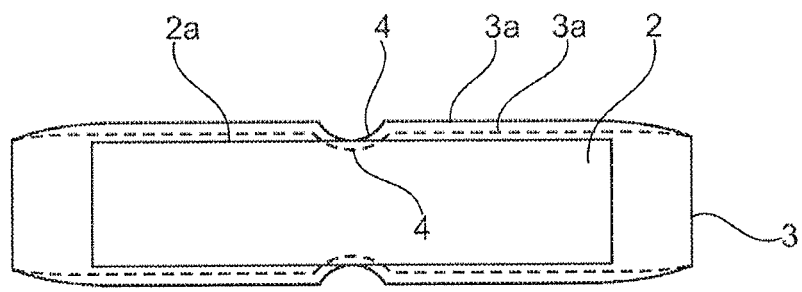
FIG. 9 illustrates the deformation of a housing as a magnet is placed in position.

FIG. 9, by dashed lines, shows a housing prior to the insertion of a magnet 2, and, in solid lines, the same housing deformed after the insertion of a magnet due to the clamping of the magnet 2 at the lugs 4.

Figures 10A, 10B:
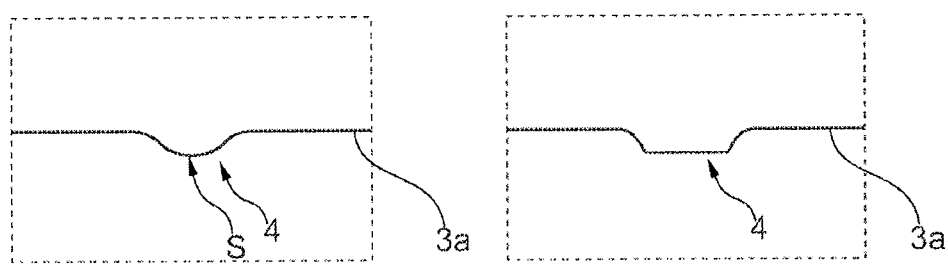
FIGS. 10a and 10b show a lug before and after cutting of the tip thereof by a magnet.

FIGS. 10a and 10b illustrate the cutting of the lugs by the magnets during the insertion thereof into their housings.

The lug 4, which is of rounded shape prior to the insertion of the magnet, is cut at its tip following the insertion of the magnet. The lug, cut in this way, undergoes, for example, a reduction in height between 1/10 and ½ of its initial height.

The invention is not limited to the examples just described.

For example, the lugs 4 may be spaced apart by more than one sheet in two in variants of the examples of FIGS. 8b and 8c.

The magnets may be placed in position in the stack by using one magnet to push the other. For example, two magnets, each of 40 mm depth, are inserted in this way.

The invention claimed is:

1. A method for manufacturing a rotor of an electric rotary machine, the method comprising:
   providing a plurality of magnetic sheets;
   providing a plurality of permanent magnets with sharp edges;
   cutting the magnetic sheets to form housings and lugs adapted to house and secure the plurality of permanent magnets, the lugs having tips;
   stacking the magnetic sheets to form a rotor magnetic mass;
   inserting the plurality of permanent magnets by force into the housings, the housings having a plurality of lugs for clamping the permanent magnets in the housings; and
   cutting the tips of the lugs of the magnetic sheets by the sharp edges of the permanent magnets as the permanent magnets are inserted into the housings.

2. The method for manufacturing a rotor of an electric rotary machine according to claim 1, the permanent magnets being made of ferrite.

3. The method for manufacturing a rotor of an electric rotary machine according to claim 1, the method further comprising:
   inserting the plurality of permanent magnets in at least one of the housings.

4. The method for manufacturing a rotor of an electric rotary machine according to claim 1, the method further comprising:

forming the housings to have, in cross section perpendicularly to an axis of rotation of the electric rotary machine, a general elongate shape along an axis.

5. The method for manufacturing a rotor of an electric rotary machine according to claim 4, the method further comprising:
forming the housings having, in cross section perpendicularly to the axis of rotation of the electric rotary machine, at least one lug per permanent magnet.

6. The method for manufacturing a rotor of an electric rotary machine according to claim 5, the method further comprising:
forming in the housings, in cross section perpendicularly to the axis of rotation of the electric rotary machine, at least one lug, per permanent magnet, on each of the opposite sides of the housing on either side of the axis.

7. The method for manufacturing a rotor of an electric rotary machine according to claim 1, the method further comprising:
forming the lugs so that the distance between the tip of a lug and the adjacent longitudinal end of a permanent magnet in contact therewith being greater than or equal to L/5, where L denotes a length of the permanent magnet.

8. The method for manufacturing a rotor of an electric rotary machine according to claim 1, before placing the permanent magnets in position, the lugs being rounded or truncated at a tip of each lug, the lugs being in contact via the tip of the lugs with the permanent magnets.

9. The method for manufacturing a rotor of an electric rotary machine according to claim 1, the method further comprising:
forming the lugs on opposite sides of a same housing facing one another.

10. The method for manufacturing a rotor of an electric rotary machine according to claim 1, the method further comprising:
forming the lugs so that a distance between a tip of a lug and the side of the housing to which said lug is connected being, prior to placement in position of the permanent magnets, between 0.25 mm and 0.35 mm.

11. The method for manufacturing a rotor of an electric rotary machine according to claim 10, the method further comprising:
forming the lugs to have a radius of curvature between 0.1 mm and 5 cm.

12. The method for manufacturing a rotor of an electric rotary machine according to claim 1, the method further comprising:
forming the lugs on each sheet of the stack of sheets so as to superimpose one another.

13. The method for manufacturing a rotor of an electric rotary machine according to claim 1, the method further comprising:
forming the lugs in one sheet in n in the stack, where n is an integer greater than 1.

14. The method for manufacturing a rotor of an electric rotary machine according to claim 1, the method further comprising:
forming, in at least one housing of the housings, at least one stop, against which a magnet received in said housing comes to rest via a longitudinal end.

15. The method for manufacturing a rotor of an electric rotary machine according to claim 4, the axis of rotation of the electric rotary machine being substantially parallel to the polar faces of the one or more permanent magnets received in the housing.

* * * * *